Oct. 27, 1953 W. T. WINTRINGHAM 2,657,254

COLOR TELEVISION SYSTEM

Filed May 20, 1950 5 Sheets-Sheet 1

INVENTOR
W. T. WINTRINGHAM
BY Hugh S. Wertz
ATTORNEY

INVENTOR
W. T. WINTRINGHAM
BY Hugh S. Wertz
ATTORNEY

INVENTOR
W. T. WINTRINGHAM
BY Hugh S. Wertz
ATTORNEY

INVENTOR
W. T. WINTRINGHAM
BY Hugh S. Wertz
ATTORNEY

INVENTOR
W. T. WINTRINGHAM
BY Hugh S. Wertz
ATTORNEY

Patented Oct. 27, 1953 2,657,254

UNITED STATES PATENT OFFICE 2,657,254

COLOR TELEVISION SYSTEM

William T. Wintringham, Chatham, N. J., assignor to Bell Telephone Laboratories, Incorporated, New York, N. Y., a corporation of New York Application May 20, 1950, Serial No. 163,271

6 Claims. (Cl. 178—5.4)

This invention relates to television systems and more particularly to color television systems.

The present invention finds primary application with color television transmission systems which are of the so-called "simultaneous" type where each of the three component color images is simultaneously analyzed and transmitted, but additionally it can be modified, in a manner to be described, for use with the so-called "sequential" type where there is a cyclic change between the three components of the color images transmitted.

It is an object of this invention to improve the reproduction of color images in such systems, and more particularly to increase the brilliance and fidelity of such reproduction.

Under normal conditions of viewing color television images, with ambient illumination and visible surroundings, it is natural to expect the observer to compare the reproduced colors with those of objects in the viewing room. It is to be expected moreover, that the white, which in most of the color systems hitherto known has been formed by an additive mixture of the three primary components at the receiver, when compared with the white in the viewing room produced by the continuous spectra from the room illumination, will prove least satisfactory for observers. For this reason, and to increase the brilliance of near-white high lights, the invention provides a color television receiver which uses white as a component color thereof.

Moreover, if color television is to be considered as a medium for high fidelity color matching instead of as an entertainment medium, there is little question of the inadequacy of present three-color systems which have been more concerned with the problem of producing a pleasing image than with that of reproducing a high fidelity facsimile of the original object scene. Colorimetric considerations indicate that a color television system where color fidelity is important should use more than three colors in reproducing the image, since it is impossible to match all colors additively with only three colors. In my copending application Serial No. 163,272, filed May 20, 1950, there is disclosed a multicolor television receiver which utilizes a plurality of primaries and an arrangement whereby, for any specific color match, the most suitable three therefrom are used. The present invention is an improvement thereon by the inclusion of white as one of the primary colors to be used for every match. The choice of white for each match is particularly desirable because, in addition to insuring the high brilliance of white and near-whites, it makes possible, for reasons described more fully hereinafter, the unique selection of the most suited primaries for the match.

It is another feature of this invention that, although the receiver utilizes more than three component color sources in reproducing the color images, only three-color video signals need be received. This expansion is effectuated by use of color coordinate transformers by means of which the transmitted video signals are transformed into a plurality of ternary sets of colorimetrically equivalent signals, and a selecting circuit makes the successful discrimination therebetween to obtain the highest fidelity match.

For proper understanding of the full scope of the present invention, resort is first necessary to a few principles of colorimetry. It has long been known that a normal observer can duplicate the effect of any color stimulus by mixing the light from three primary stimuli in the proper proportions. The numbers representing the amount of each of the primary stimuli needed to color-match the unknown color are known as the tristimulus values. However, in practice, no ternary set of real primaries can be found that will match all colors without employing negative amounts of at least one of the primaries. Therefore, if negative tristimulus values are to be avoided, the primaries to be used must be chosen outside the realm of real colors. The I. C. I. primaries X, Y, and Z which have been adopted by the International Commission on Illumination (I. C. I.) have this characteristic. All the spectrum colors are thereafter defined in terms of three tristimulus values or distribution coefficients $\bar{x}$, $\bar{y}$ and $\bar{z}$, each of which is a measure of the amount of the corresponding I. C. I. primary X, Y or Z required to color-match a unit quantity of radiant energy thereof. The evaluation of the quality of color or chromaticity is accomplished by defining three new quantities $x$, $y$ and $z$, derived from the tristimulus values and termed trichromatic coefficients or coordinates, in a manner that their sum is always unity. This latter characteristic permits the convenient representation of chromaticities on a two-dimensional diagram which is called a chromaticity or color diagram. A chromaticity diagram has the important property that if the chromaticity of two distinct colors be plotted, the resultant color of any additive mixture thereof, will always lie on a line connecting the two chromaticities. This also leads to the further property that if the chromaticities of three colors are plotted on a chromaticity diagram, any color whose chromaticity falls within the color triangle having for its vertices the three points plotted, can be formed by additive mixtures of the three colors. Moreover, it is a further characteristic that a color which is defined in terms of tristimulus values corresponding to one ternary set of primaries can be redefined, by means of a linear transformation, by new tristimulus values corresponding to any other ternary set of primaries. For a more complete discussion of colorimetric principles, reference is made to A. C. Hardy's "Handbook of Colorimetry" (1936), The Technology Press, Cambridge, Massachusetts.

Thus, if the chromaticities of the available primaries at the television receiver are plotted on a chromaticity diagram, the three thereof for the optimum additive match are those nearest the color to be matched and which form a triangle including the color. In accordance with one feature of the present invention, the choice is made unique by using white as one of the vertices of each color triangle.

In the practice of the present invention, there is also provided an electrical system which can determine in which of a given set of triangles a particular color falls. Further means are provided for utilizing this selection to energize associated primary sources at the receiver.

This system can be used in a direct fashion for multicolor television by the use of a ternary set of color pick-ups associated with each color triangle, but this is not feasible since a separate transmission channel is then required for the control of each primary color.

However, as is well known in the color art, when the amplitudes of a ternary set of primaries matching a given color are known, the amplitudes of any other ternary set thereof which are the colorimetric equivalent, can be determined by a linear transformation. This makes feasible the use of one three-color pick-up and the transmission of a single set of three-color video signals for a multicolor system, independent of the color triangles to be used at the receiver. The video three-color signals transmitted are transformed by coordinate color transformers, to be described hereinafter, into a series of colorimetrically equivalent ternary sets of signals.

In a color television system in accordance with the invention, the aforementioned objects and features are realized and the principles mentioned above utilized by a system in which: a receiver unit receives the transmitted video signals and then separates out the three color signal components thereof; a plurality of color coordinate transformers transform this one ternary set of color signals into a plurality of ternary sets of colorimetrically equivalent signals, each characterized by a "white" signal; electrical circuits thereafter automatically select therefrom the unique set for the optimum color match; and light sources associated with the selected set produce the desired color match.

The invention will be more fully understood by reference to the following description taken in connection with the accompanying drawings forming a part thereof in which.

Figure 1:
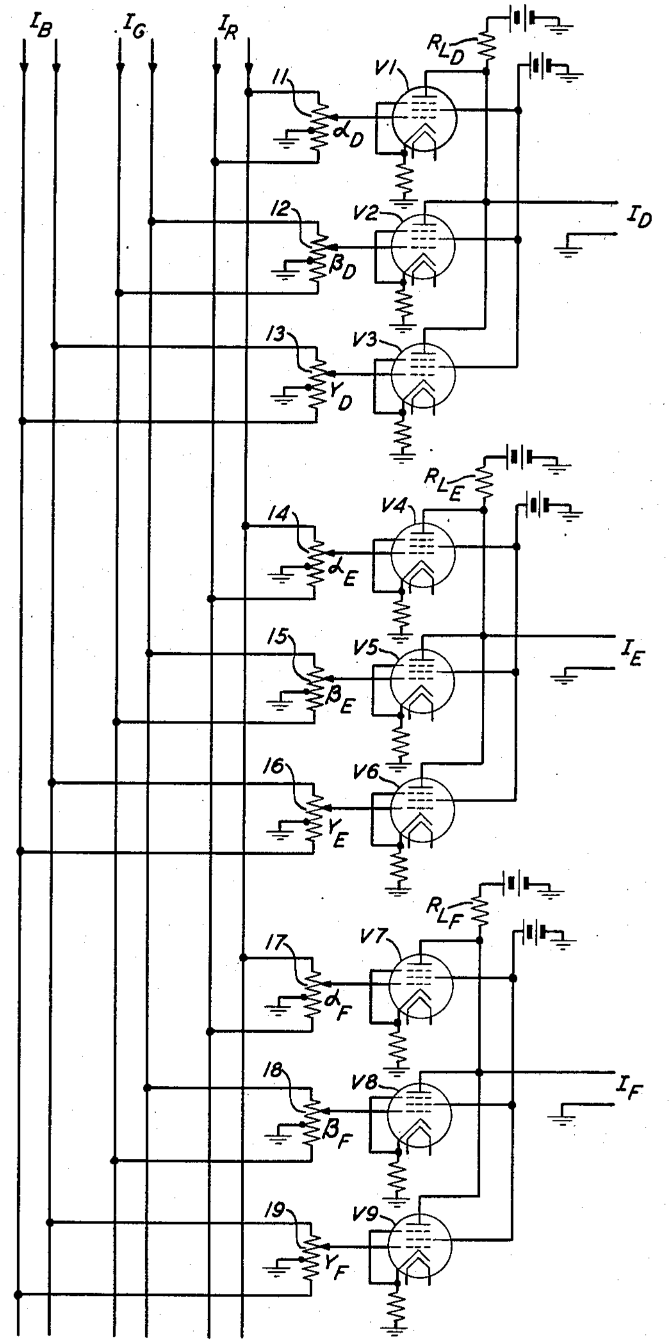
Fig. 1 illustrates diagrammatically a color coordinate transformer which can be used in the practice of the invention.

Referring more specifically to the drawings, Fig. 1 shows diagrammatically an illustrative embodiment of an electrical arrangement for color coordinate transformation which can be used in the practice of the invention. As is well known in color work, when the three amplitudes of a ternary set of primaries matching a color are known, the three amplitudes of any other ternary set of primaries for a color match can be evaluated by a linear transformation. If $I_R$, $I_G$, and $I_B$ are the amplitudes of the three-color signals transmitted representative of a color $C_1$ of the object scene, and D, E, and F are three primaries at the receiver with which it is sought to match the color $C_1$, then the currents $I_D$, $I_E$, and $I_F$ to control these three primaries, respectively, are related to the amplitudes of the signals being transmitted by the linear equations:

$$I_D=k(\alpha_D I_R+\beta_D I_G+\gamma_D I_B) \quad (1)$$

$$I_E=k(\alpha_E I_R+\beta_E I_G+\gamma_F I_B) \quad (2)$$

$$I_F=k(\alpha_F I_R+\beta_F I_G+\gamma_F I_B) \quad (3)$$

The constants $\alpha$, $\beta$, and $\gamma$ depend only on the colors of the new primaries D, E, and F, and are invariable once such primaries have been selected. The transformation of a color from the (R), (G), and (B) system to the (D), (E), and (F) system by electrical means is shown in Fig. 1. Each of the signals $I_R$, $I_G$, and $I_B$ supplies three potentiometers which are adjusted in accordance with the $\alpha$, $\beta$, and $\gamma$ coefficients of the linear Equations 1, 2, and 3. For example, the current $I_R$ supplies the three potentiometers 11, 14, and 17 which are adjusted to the coefficients $\alpha_D$, $\alpha_E$, and $\alpha_F$ of Equations 1, 2, and 3, respectively. Similarly the currents $I_G$ and $I_B$ supply other potentiometers adjusted to corresponding $\beta$ and $\gamma$ coefficients. The voltages $\alpha_D I_R$, $\beta_D I_G$, and $\gamma_D I_B$, which are the three components of Equation 1, are supplied to the grids of three pentodes V1, V2, and V3, which are operated as conventional single-stage amplifiers. Addition of the three components in accordance with Equation 1 is effected through the use of a common load resistor $R_{L_D}$ for the three amplifier tubes V1, V2, and V3 to produce the current $I_D$. Similar sets of three amplifier tubes V4, V5, and V6, and V7, V8, and V9, respectively operating into common load resistors $R_{L_E}$ and $R_{L_F}$, respectively, are used in accordance with Equations 2 and 3 to produce the currents $I_E$ and $I_F$. The arrangement above described is intended as an illustrative embodiment of the principle of color coordinate transformation. Other arrangements consistent with these precepts are also feasible for the transformation.

One such color coordinate transformer is required for each ternary set of primaries to be used at the receiver. In the four-color system described to illustrate the present invention, three such coordinate transformers are necessary. The transmitted signals $I_R$, $I_G$, and $I_B$ are converted into three ternary sets; the first includes $I_D$, $I_E$, and $I_W$, the second $I_D$, $I_F$, and $I_W$, and the third $I_E$, $I_F$ and $I_W$, to correspond to the associated primaries, W, D, E, and F at the receiver, W being the white primary formed by an appropriate source at the receiver.

Figure 2:
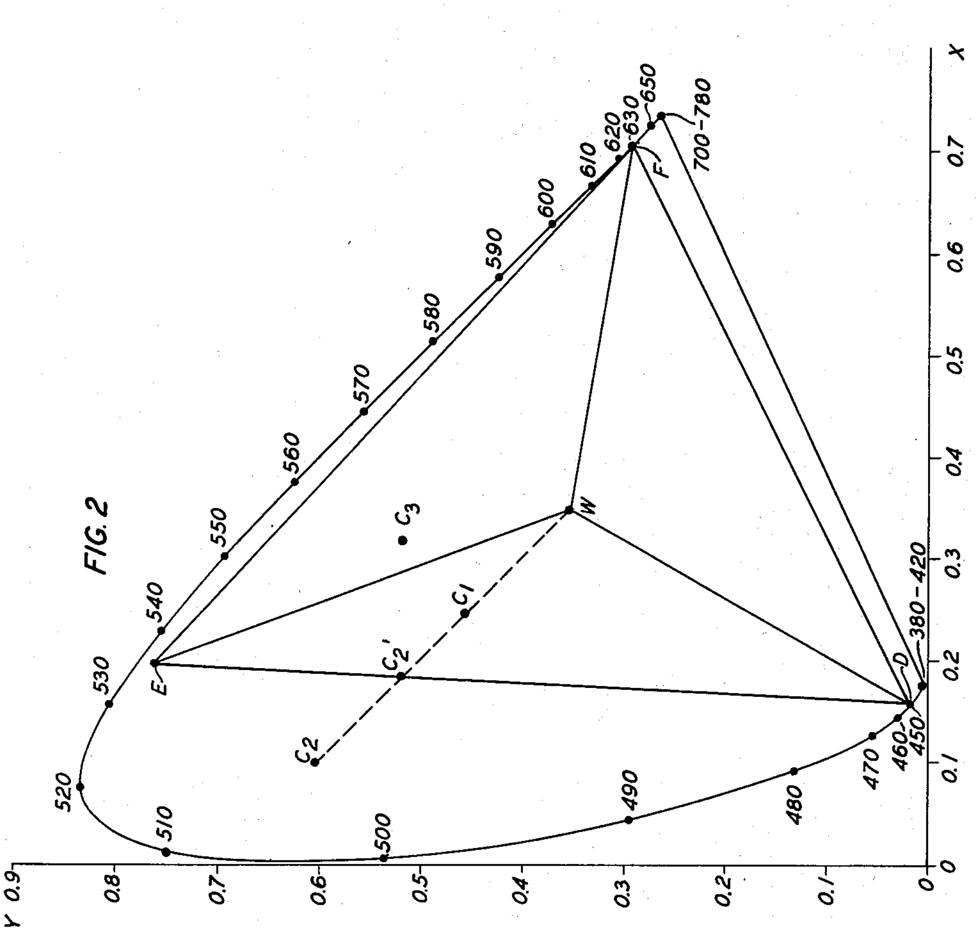
Fig. 2 is a chromaticity diagram to aid in the explanation of the principles underlying the invention.

Fig. 2 is a color or chromaticity diagram which will be useful in the description of the invention. A chromaticity diagram has the useful property that if the chromaticity coordinates of three primaries be plotted thereon, any color whose coordinates lie within the triangle having for its vertices the three points plotted can be formed by an additive mixture of the three primaries and also, that any color whose coordinates are not so contained cannot be formed thereby since it is impossible to produce physically a negative amount of light. For the purpose of simplicity, the invention will be described in a system which has four primaries at the receiver. However, it is to be understood that the invention can be adapted for use with any number of primaries. The coordinates of the four primaries D, E, F and W available at the receiver have been plotted, and the three triangles WDE, WDF, and WEF have been formed. W, the white primary, is common to all three triangles, in accordance with one aspect of the invention. Associated with each triangle is a color coordinate transformer of the kind shown in Fig. 1. These color transformers transform the ternary set corresponding to signals of the color $C_1$, being transmitted in the (R) (G) (B) system, to a colorimetrically equivalent set for each of the (D) (E) (W), (D) (F) (W), and (E) (F) (W) systems, in the manner hereinbefore described. In the case where the coordinates of the color $C_1$ lie within the triangle WDE, the three signals from the color transformer associated therewith will all be positive since an additive match is possible. However, for the other triangles WDF and WEF, there will be at least one negative signal since an additive match is not possible. The important fact here is that all three signals are positive only at the output of the color transformer corresponding to the triangle WDE within which the color $C_1$ lies, and at least one signal is negative in every other triangle. This fact is utilized to select electrically the optimum match.

Also with reference to Fig. 2, consider the color $C_2$ having coordinates which fall outside all the color triangles corresponding to the sets of primaries D, E, F, and W, at the receiver. Then at least one signal in each of the three associated color transformers will be negative since an additive match is impossible. In this special case, the electrical mechanism should be such that the primaries D and E are turned on to produce the color $C_2'$ corresponding to zero amplitude of primary W. In no case is the polarity of the W output of any transformer negative except when the color is outside all of the triangles. In the latter case, however, there will be one transformer whose other two outputs are positive, which will give the desired match. Therefore, it is necessary that the selecting circuit used should not be controlled by the polarity of the W outputs. Since the light source of primary W can never produce a negative output, the color match is unaffected by a negative W signal.

Figure 3:
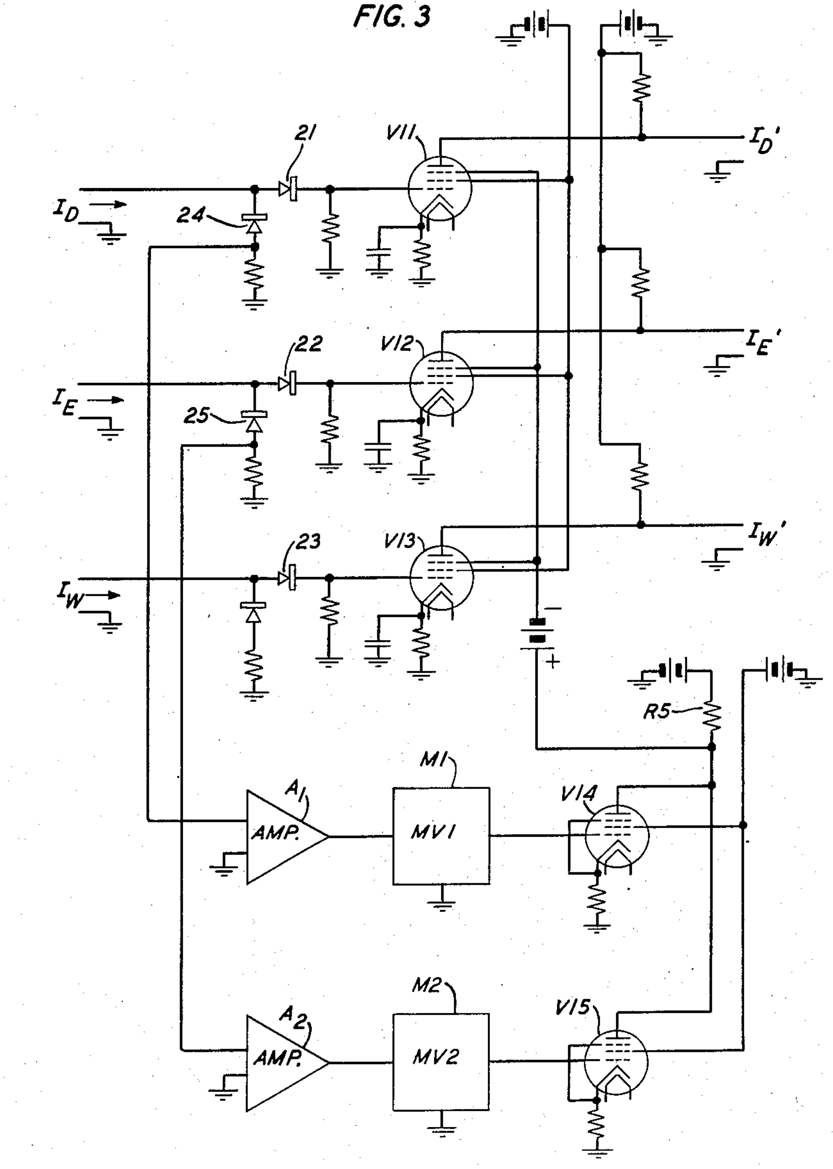
Fig. 3 illustrates, partly in block schematic form and partly diagrammatically, a selecting circuit which can be used in the practice of the invention.

Fig. 3 shows, partly in block schematic form and partly diagrammatically, an illustrative embodiment in accordance with the invention of a selecting, or disabling, circuit which automatically selects the output of the particular color transformer that gives the best match. As was hereinabove described, the three color transformers of a four-color system each produce a ternary set of signals which is the colorimetric equivalent of the color being matched. However, the desired set is characterized by the fact that its two outputs, exclusive of the W output, are positive. The selecting circuit must automatically discriminate between the three available sets by this characteristic. In the illustrative embodiment shown, a gating amplifier, with the gating control applied to the suppressor grid of a pentode tube, is inserted in each circuit associated with one of the three separate outputs of each color transformer. For the sake of illustration, the ternary set $I_D$, $I_E$, and $I_W$ associated with the color transformer for triangle WDE has been chosen. The gating amplifiers are shown as the pentodes V11, V12, and V13, whose control grids are supplied with signals $I_D$, $I_E$, and $I_W$, respectively. The pentodes V11, V12, and V13 are operated as gating amplifiers in a manner well known to the art. Series rectifiers 21, 22, and 23, poled to pass only positive signals, are inserted in the input circuits of the three gating amplifiers V11, V12, and V13, respectively. The input signals $I_D$ and $I_E$ are also supplied to amplifiers A1 and A2, respectively. The rectifiers 24 and 25 are inserted in the input circuits of A1 and A2, respectively, and are poled to pass only negative signals. The amplifiers A1 and A2 can be of any conventional design adapted to receive negative input signals. The outputs of the two amplifiers A1 and A2 are supplied to multivibrators M1 and M2, respectively. These multivibrators have one position of stability, and produce a sharp positive pulse when triggered by a negative input but return to a stable position immediately after this signal is removed. Any of the arrangements known in the art for producing this desired effect can be utilized. The multivibrators thereafter supply the input circuits of the isolated amplifiers V14 and V15, which are pentodes operated, in a manner well known in the art, for adding the outputs of the two multivibrators M1 and M2 by means of a common load resistor $R_5$ in the plate circuits. The control voltage which is developed at the common plate load $R_5$ of tubes V14 and V15 is supplied to the suppressor grids of each of the tubes V11, V12, and V13.

The operation of the selecting circuits of Fig. 3 is as follows. First, suppose that the color $C_1$ shown in Fig. 2 whose coordinates lie within the color triangle WDE is being transmitted. Then as described hereinbefore, the outputs $I_D$, $I_E$, and $I_W$ of the color transformer associated therewith are all positive. Since rectifiers 24 and 25 are poled to pass only negative signals, the control circuits comprising the amplifiers A1 and A2 are inoperative since no signal is supplied thereto. Tubes V11, V12, and V13, in the absence of gating pulses on the suppressor grids thereof, function as conventional amplifiers to provide the outputs $I_D'$, $I_E'$, and $I_W'$ which are utilized to actuate associated light sources. The above description is also applicable for the case of color $C_2$ of Fig. 2 with the exception that because $I_W$ is negative, the gating amplifier V13 will receive no input signals because of the blocking effect of the rectifier 23 which is poled to pass only positive signals. For the color $C_3$ shown in Fig. 2, which lies in the triangle WEF, the $I_D$ output of the color transformer for triangle WDE will be negative indicating that an additive match is impossible with the sources D, E and W. This negative signal is supplied through the rectifier 24 to the amplifier A1 and the amplified output thereof, in turn, trips the multivibrator M1, which produces a positive step voltage therefrom which is thereafter reversed by the isolating amplifier V14. This negative pulse is then applied to the suppressor grids of each of the gating amplifiers V11, V12, and V13, and keeps each unresponsive to all input signals so long as the output $I_D$ is negative. An arrangement of the kind described is associated with the outputs of each color transformer to act as a disabling mechanism if either of the outputs thereof, exclusive of the W output, is negative. The particular arrangement just described is merely illustrative of one possible type of selecting means. One skilled in the art can easily devise others to achieve the desired disabling.

Figure 4:
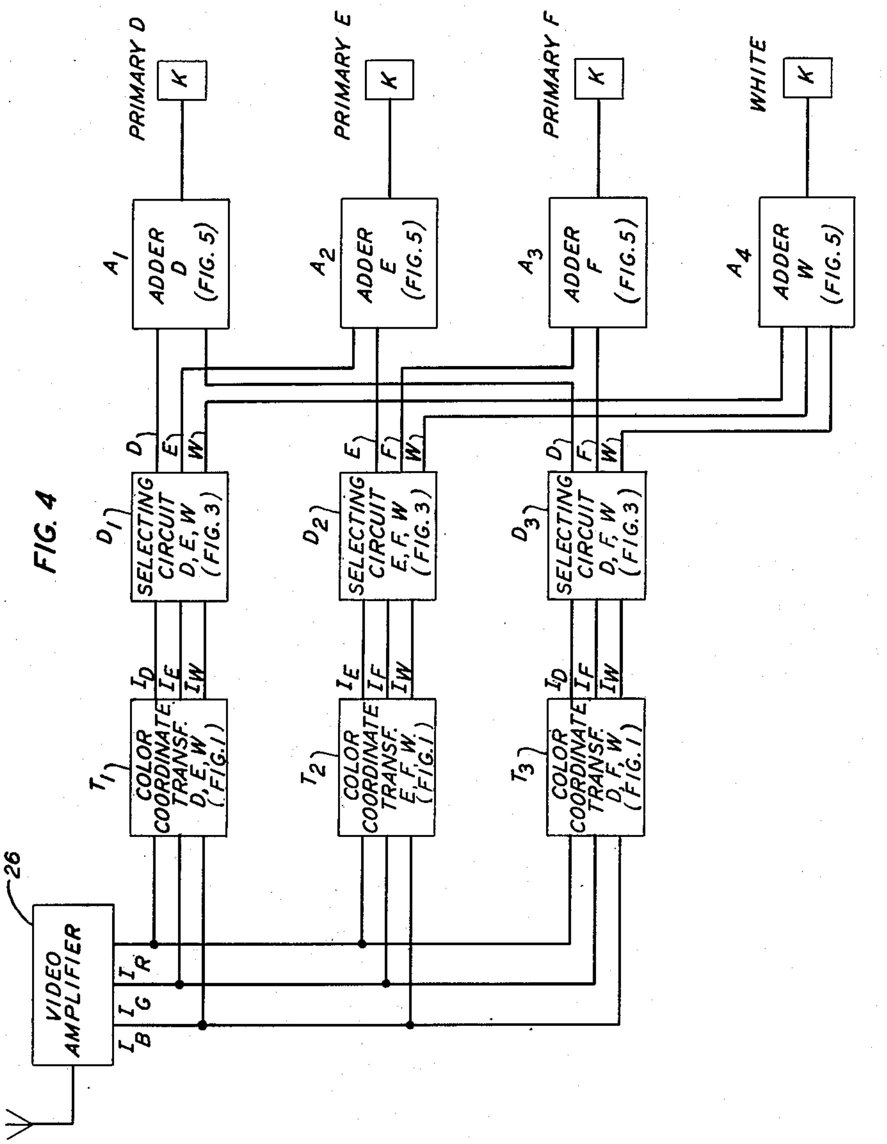
Fig. 4 shows in block schematic form an illustrative embodiment of a color television receiver in accordance with the invention.

Fig. 4 shows in block schematic form an illustrative embodiment of a four-color television receiver in accordance with the invention. The video amplifier 28 receives the transmitted video signals and supplies therefrom the ternary set of signals $I_R$, $I_G$, and $I_B$, representing the color C in the (R) (G) (B) system to each of the three color transformers $T_1$, $T_2$, and $T_3$, to be transformed into three ternary sets of colorimetrically equivalent signals [$I_D$] [$I_E$] [$I_W$], [$I_D$] [$I_F$] [$I_W$], and [$I_E$] [$I_F$] [$I_W$], respectively. Each transformer has three characteristic color outputs corresponding to ternary combinations of light sources at the receiver, of which white is common to all. Associated with the color transformers $T_1$, $T_2$ and $T_3$ are corresponding disabling or selecting circuits $D_1$, $D_2$ and $D_3$ to render ineffective all of the outputs of any transformer of which either of the two outputs thereof, exclusive of the white, is negative. As was hereinabove discussed, it is a characteristic of this color transformation, that the ternary set for the optimum match, is the only one not rendered ineffective by its associated disabling circuit. The separate outputs of every disabling circuit are supplied to adding circuits $A_1$, $A_2$, $A_3$ and $A_4$ to be described. Each of the adders $A_1$, $A_2$, $A_3$ and $A_4$ is adapted to add the separate outputs corresponding to its associated primary source (including white). Thereafter, the output of each adder is supplied to the control grid of an associated kinescope K, in a manner well known in the art. These serve as the primary light sources. Filters are associated with these kinescopes, in a manner well known in the art, to obtain the desired (D), (E), (F), and (W) colors, which are mixed to produce facsimiles of the color images transmitted.

Figure 5:
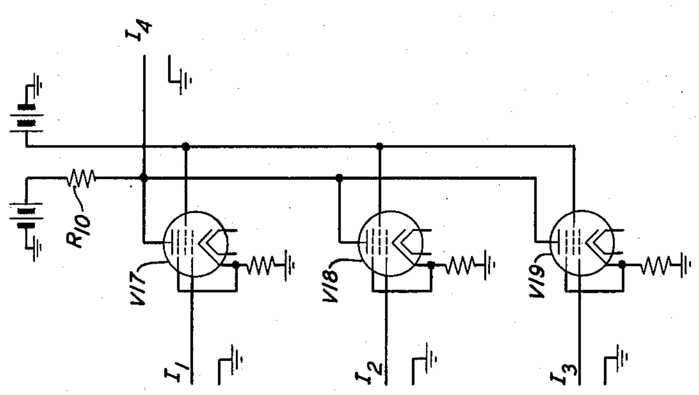
Fig. 5 shows diagrammatically an illustrative adding circuit which can be used in the practice of the invention.

Fig. 5 shows diagrammatically a simple illustrative adding circuit, of the kind shown in block schematic form in the arrangement of Fig. 4, which can be utilized to add the several outputs corresponding to the same primary into a single signal for supplying the associated kinescope. In this illustrative embodiment, where only four primary sources have been shown, such adders are superfluous. Adders become necessary when mixed primaries are formed by combining light from several sources to simulate a source in the manner described more fully in my copending application, Serial No. 163,273, filed May 20, 1950. The signals $I_1$, $I_2$, and $I_3$ to be added are supplied to the control grids of separate pentodes V17, V18, and V19, respectively, which are operated as conventional amplifiers. The outputs thereof are combined to form an output $I_4$ by means of a load resistor $R_{10}$ common to the plate circuits of tubes V17, V18, and V19.

Figure 6:
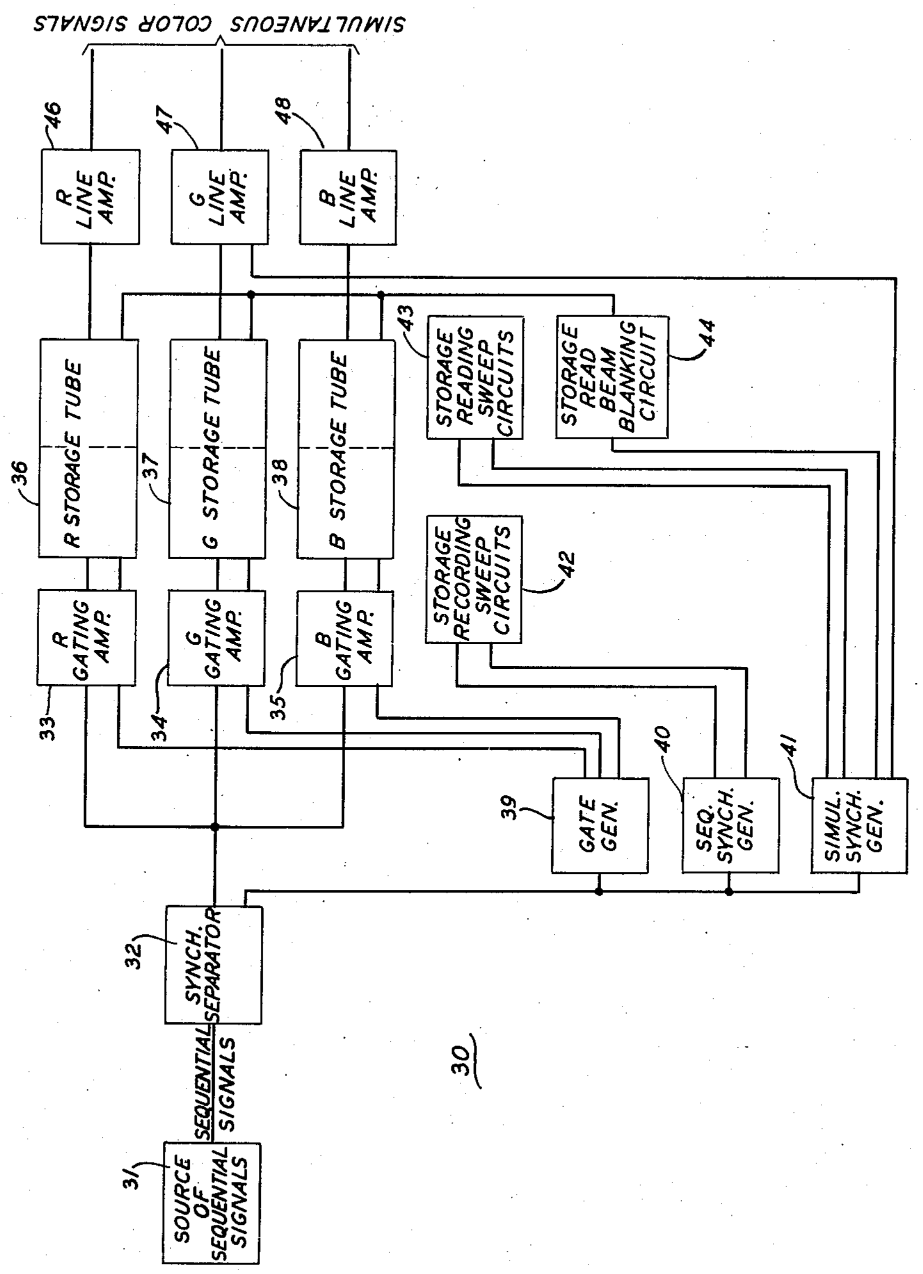
Fig. 6 shows in block schematic form an illustrative arrangement for converting sequential type signals into simultaneous signals for use with color coordinate transformers.

Fig. 6 shows in block schematic form an illustrative arrangement 30 for converting sequential-type signals into simultaneous signals for use in a color system of the kind described. It is evident that for color transformation by means of a color coordinate transformer of the kind hereinbefore described (see Fig. 1), three simultaneous color signals must be supplied thereto. This makes necessary the conversion to a simultaneous system if sequential-type signals are transmitted. Since, in such a system, the signals for each of the three primaries are transmitted cyclically at successive times, one expedient for obtaining simultaneous signals is by introduction of delay. This is the technique used in the arrangement 30 where storing devices, as for example, storage tubes, are utilized to produce the necessary delays. A typical storage tube which can be adapted for use herefor is described in the RCA Review, Volume IX, page 112 (1948) "Barrier Grid Storage Tube and Its Operation." The sequential signals, which for purposes of illustration are described as composed of (R), (G), and (B) components, respectively, are supplied from a source 31 through the synchronizing separator 32 of any kind well known in the art, to three gating amplifiers 33, 34, and 35, associated with the (R), (G), and (B) output signal channels, respectively. These supply corresponding storage devices 36, 37, and 38, respectively, which are described as storage tubes, for example. The synchronizing separator 32 also furnishes necessary synchronizing pulses to the gating generator 39, the sequential synchronizing generator 40, and the simultaneous synchronizing generator 41. The gating generator 39 supplies the necessary gating pulses to the gating amplifiers 33, 34, and 35 so as to distribute the (R), (G), and (B) component signals to their corresponding storage devices 36, 37, and 38, respectively. The sequential synchronizing generator 40 furnishes the storage recording sweep circuits 42 with synchronizing pulses to insure the proper synchronization of the recording cycle of the storage process. Similarly, the simultaneous synchronizing generator 41 drives the storage reading sweep circuits 43 to provide proper synchronization in the reading cycle, and also provides signals to the storage reading beam blanking circuit 44, which supplies blanking pulses to the reading beams of the storage tubes 36, 37, and 38, to insure the simultaneity of the reading. Each of the storage devices 36, 37, and 38 is connected to its associated line amplifier 46, 47, and 48, corresponding to the (R), (G), and (B) components, respectively. The synchronizing pulses for the simultaneous set are supplied to the (G) component in its associated amplifier 47 from the simultaneous synchronizing generator 41. The three outputs of the amplifiers 46, 47, and 48 then represent simultaneous color signals which are facsimiles of the sequential signals after separation supplied from the source 31 and are now adaptable for utilization by color coordinate transformers in the manner hereinbefore described in accordance with the invention.

If the storage devices are storage tubes and are perfect in the sense that there is no interaction between the recording and reading, the simultaneous reading may occupy the same time that is required to write all three color signals sequentially. This means that the simultaneous field rate can be one third the sequential field rate. If such perfection is not possible, the simultaneous reading rate must be about the same as the sequential recording rate, or the time required to read all the three simultaneous color signals must be approximately the time required to record one sequential color signal. This latter type of operation requires that the recorded signal be reread a total of three times from each record before the record is erased. Alternatively, a system can be devised in which simultaneous color signals are available for one third of the time, and during the remaining two thirds, no color information is available. Other arrangements for transformation from the sequential to simultaneous signals, which will be apparent to workers skilled in the art, can be utilized in accordance with the invention.

It is to be understood that the various functional arrangements are illustrative of the principles of the invention. Numerous other arrangements can be devised to perform these various functions by one skilled in the art without departing from the spirit and scope of the invention.

What is claimed is:

1. In a television receiver adapted for receiving ternary sets of color signals characteristic of the elements of a color picture, a primary light source of white, a plurality greater than two of other primary light sources of different colors, means for receiving a ternary set of transmitted color signals, a plurality of color coordinate transformers for transforming said received ternary set corresponding to one element of the color picture into a plurality of different colorimetrically equivalent ternary sets, each equivalent set controlling a different ternary combination of the white source and two of said different color sources, electrical circuit means for selecting therefrom one ternary set, and means utilizing the selected ternary set for actuating the controlled ternary combination of light sources.

2. In a television receiver adapted for receiving ternary sets of color signals representative of elements of a color picture, a primary light source of white, a plurality greater than two of other primary light sources of different colors, means for receiving a ternary set of transmitted color signals, a plurality of color coordinate transformers, each for transforming the received ternary set into a colorimetrically equivalent ternary set, each equivalent ternary set controlling a different ternary combination of the white source and two of said different color sources, polarity sensitive electrical circuit means for selecting therefrom one ternary set, and means for utilizing the selected ternary set for energizing the controlled ternary combination of light sources.

3. In a television receiver adapted for receiving ternary sets of color signals representative of elements of a color image, a primary light source of white, a plurality exceeding two of other primary light sources of different colors, means for receiving a ternary set of transmitted color signals, a plurality of color coordinate transformers, each for transforming the received ternary set into a colorimetrically equivalent set, each equivalent set being a measure of amounts of the white and two of the different colors needed to color match the color image, electrical circuit means supplied with said equivalent sets for selecting therefrom that ternary set which is characteristic of positive amounts of the two different colors, and means for utilizing said selected set to reproduce a facsimile of the corresponding element of the color image.

4. A color television receiver according to claim 3 in which the electrical circuit means are polarity sensitive and comprises means for disabling those of said ternary sets which are characterized by negative amounts of any of the different colors.

5. In a color television receiver adapted for receiving ternary sets of color signals representative of elements of a color image characterized by a particular set of coordinates on a chromaticity diagram, a plurality exceeding three of sources of white and different colors, each of said colors being characterized by a chromaticity on a chromaticity diagram, a plurality of color coordinate transformers, each for transforming a received ternary set of color signals into a different colorimetrically equivalent ternary set, each of which equivalent sets is a measure of the amount of white and two different colors to color match the corresponding element of the color image, electrical circuit means for selecting therefrom that ternary set whose corresponding colors are characterized by chromaticities on the chromaticity diagram which form the vertices of the triangle which includes the chromaticity of the corresponding element of the color image, and means for utilizing the selected ternary set to reproduce the corresponding element of the color image.

6. In a television receiver for reproducing a color of an object scene, means for receiving a ternary set of color signals, the ternary set at each instant representative of the color of an instant element of the object scene, a source of white light, a plurality exceeding two of sources of light of different colors, pairs of sources of light of different colors being associated with the white source for forming a plurality of ternary combinations of light sources, electrical circuit means under the control of the received ternary set of color signals for selecting in response thereto a particular one of the ternary combinations, and electrical circuit means for energizing only the three light sources forming the selected ternary combination for reproducing the color of the instant element of the object scene.

WILLIAM T. WINTRINGHAM.

References Cited in the file of this patent

UNITED STATES PATENTS

| Number | Name | Date |
|---|---|---|
| 2,253,086 | Murray | Aug. 19, 1941 |
| 2,423,769 | Goldsmith | July 8, 1947 |
| 2,434,561 | Hardy | Jan. 13, 1948 |
| 2,492,926 | Valensi | Dec. 27, 1949 |
| 2,509,038 | Goldsmith | May 23, 1950 |
| 2,560,567 | Gunderson | July 17, 1951 |